Patented Aug. 6, 1935

2,010,608

UNITED STATES PATENT OFFICE 2,010,608

GAS ELECTRODE

Erwin A. Schumacher and Victor C. Hamister, Lakewood, and George W. Heise, North Olmsted, Ohio, assignors to National Carbon Company, Inc., a corporation of New York No Drawing. Application August 11, 1931, Serial No. 556,458

24 Claims. (Cl. 136—121)

The invention pertains to gas permeable carbon electrodes for primary battery cells, and more specifically to improvements in such electrodes especially adapted for air depolarized cells in which an active ingredient of the electrolyte is caustic alkali, and the chief ingredient of the anode is zinc.

An essential requirement for the satisfactory performance of such an air depolarized cell is a high degree of depolarizing activity or ability for the carbon electrode or cathode, a property greatly affected if not entirely destroyed if the carbon becomes soaked with electrolyte. It is therefore important that the electrode shall be sufficiently porous or permeable to air or gas to permit maintenance of its depolarizing activity, and yet that it shall be highly resistant to electrolyte penetration.

An electrode that is permeable to air may be made of charcoal that has been mixed with a suitable binder, molded into the desired shape or form, and then baked. To give such an electrode a sufficient resistance to electrolyte absorption, it is usually impregnated with a solution of oil, paraffin, or the like, in a volatile solvent which can be removed by heat. As the impregnating medium lessens depolarizing ability, its concentration should be kept as low as possible.

This invention contemplates an improvement in such an electrode by increasing its resistance to absorption of electrolyte without decreasing its depolarizing ability, thereby increasing its effectiveness and permanence under battery conditions. For such an electrode the amount of impregnating medium may be kept at a minimum without impairing resistance to electrolyte absorption, and the effect on the operating voltage of batteries is correspondingly slight. Other aims and objects will appear throughout the following specification and the accompanying claims.

In practicing our invention, powdered wood charcoal may be intimately mixed with the desired quantity of a black such as coal tar oil lampblack. To this mixture a binder solution of molasses or equivalent is added slowly, with continued stirring to prevent lumping, in quantity just sufficient to permit molding. The molding pressure is kept as low as is consistent with the achievement of adequate strength in the finished block. The molded blocks may be heated at approximately 80° C. until moisture is removed, then packed in sand or coke and baked in clay containers to a temperature of 800° to 1000° C.

In a test made under controlled conditions electrodes made entirely of granular carbon such as charcoal (one part of 35 mesh to one part of 200 mesh material) were compared with the improved electrode (one part 35 mesh charcoal to one part lampblack). After being subjected to identical impregnating treatment with electrolyte-repellent materials, these electrodes were used as air depolarizing cathodes in regular battery assemblies against zinc anodes and an electrolyte containing about 230 grams of caustic soda per liter of water. At the termination of the test it was found that for the particular discharge rate used the lampblack-containing electrode had absorbed only 35 to 40 per cent as much electrolyte as the charcoal blocks, while the operating voltage had been substantially the same for the duration of the discharge in both cases. It is clear, therefore, that the addition of the black material increased the ability to resist electrolyte penetration without reducing the depolarizing ability of the electrode. It is also clear that the use of lampblack permits a lower concentration of waterproofing material to be used to produce an electrode of satisfactory electrolyte repellent quality, and that therefore the operating voltage can more readily be maintained than if the lampblack were omitted.

The ratio of charcoal and black may be varied within wide limits. One part of black to four parts of charcoal shows substantial beneficial effect and less may be used. A preferred composition contains charcoal and black in subsantially equal proportions by weight.

It is evident, therefore, that we have made a decided improvement in air depolarized cells of the kind described.

We claim:

1. An air-depolarizing, electrolyte-absorption-resistant battery electrode comprising substantially equal parts of charcoal and a black.

2. An air-depolarizing, electrolyte-absorption-resistant battery electrode comprising charcoal and 5% or more of a black.

3. An air-depolarizing, electrolyte-absorption-resistant battery electrode comprising charcoal and a black.

4. An air-depolarizing, electrolyte-absorption-resistant battery cell electrode of carbon including a coal tar oil black.

5. A chemically active, gas-pervious, electrolyte-repellent cathode for an air depolarized battery cell having caustic alkali electrolyte and a zinc anode comprising substantially equal portions of charcoal and a black.

6. A chemically active, gas-pervious, electrolyte-repellent cathode for an air depolarized battery cell having caustic alkali electrolyte and a zinc anode comprising substantially charcoal and 5% or more of a black.

7. A chemically active, gas-pervious, electrolyte-repellent cathode for an air depolarized battery cell having caustic alkali electrolyte and a zinc anode comprising charcoal and a black.

8. A chemically, gas-pervious, electrolyte-repellent carbon cathode including coal tar oil black for an air depolarized battery cell having caustic alkali electrolyte and a zinc anode.

9. A chemically active, gas-permeable, absorption-resistant, air-depolarizing, galvanic cell electrode, comprising; a porous block of powdered wood charcoal and lampblack; and electrolyte-repellent material on the active surface of said block.

10. A chemically active, gas-permeable, absorption-resistant, air-depolarizing, galvanic cell electrode, comprising; a porous block of granular carbon and a black; and a gas-pervious, electrolyte-repellent material on the active surface of said block.

11. A chemically active, gas-permeable, absorption-resistant, air-depolarizing, galvanic cell electrode, comprising; a porous block of carbon and a black; and electrolyte-repellent material on the active surface of said block.

12. A chemically active, gas-permeable, absorption-resistant, air-depolarizing, galvanic cell electrode, comprising; a porous block of carbon, lampblack, and a binder; and electrolyte-repellent material on the active surface of said block.

13. In an air-depolarized galvanic cell having liquid electrolyte; a chemically active, gas-permeable, absorption-resistant, air-depolarizing electrode, consisting of; an agglomerated block of powdered wood charcoal, a black, and a binder; and electrolyte-repellent material on the active surface of said block.

14. An air-depolarized cell having a gas-permeable cathode consisting of charcoal, a black, and electrolyte-repellent means.

15. An air-depolarized cell having a gas-permeable cathode consisting of charcoal, a black, a binder, and electrolyte-repellent means.

16. An air-depolarized cell having a gas-permeable cathode consisting of substantially equal portions of charcoal and a black, a binder, and electrolyte-repellent means.

17. An air-depolarized cell having a gas-permeable cathode consisting of charcoal, 5 per cent or more of a black, a binder, and electrolyte-repellent means.

18. An air-depolarized cell having a gas-permeable cathode consisting of charcoal, coal tar oil black, a binder, and electrolyte-repellent means.

19. An air-depolarized cell having a gas-permeable cathode consisting of a porous block composed of powdered wood charcoal, a black, a binder, and electrolyte-repellent means.

20. An air-depolarized cell having a gas-permeable cathode consisting of an agglomerated block composed of granular charcoal, coal tar oil black, a carbon binder, and electrolyte-repellent means.

21. An air-depolarized cell having a gas-permeable cathode consisting of an agglomerated block composed of granular charcoal, coal tar oil lampblack, a carbon binder, and electrolyte-repellent means comprising oil.

22. An air-depolarized cell having a gas-permeable cathode consisting of an agglomerated block composed of granular charcoal, coal tar oil lampblack, a carbon binder, and electrolyte-repellent means comprising paraffin.

23. An air-depolarized cell having a gas-permeable cathode consisting essentially of granular charcoal, coal tar oil lampblack, a carbon binder, and electrolyte-repellent means comprising paraffin and oil.

24. An air-depolarized cell having a gas-permeable cathode comprising charcoal and a black.

ERWIN A. SCHUMACHER.
VICTOR C. HAMISTER.
GEORGE W. HEISE.

CERTIFICATE OF CORRECTION.

Patent No. 2,010,608. August 6, 1935.

ERWIN A. SCHUMACHER, ET AL.

It is hereby certified that error appears in the printed specification of the above numbered patent requiring correction as follows: Page 2, first column, line 8, claim 8, after "chemically" insert the word active; and that the said Letters Patent should be read with this correction therein that the same may conform to the record of the case in the Patent Office.

Signed and sealed this 17th day of September, A. D. 1935.

Leslie Frazer (Seal)

Acting Commissioner of Patents.